United States Patent

[11] 3,611,880

| [72] | Inventor | Ronald A. Gulick<br>Sugarland, Tex. |
|---|---|---|
| [21] | Appl. No. | 825,628 |
| [22] | Filed | May 19, 1969 |
| [45] | Patented | Oct. 12, 1971 |
| [73] | Assignee | Research Engineering Company<br>Houston, Tex. |

[54] OPERATOR AND METHOD OF LUBRICATION THEREOF
6 Claims, 3 Drawing Figs.

[52] U.S. Cl....................................... 92/154,
92/138, 184/1 E, 184/55 A
[51] Int. Cl......................................... F16n 7/30
[50] Field of Search............................ 184/1, 55
A, 6, 1 E; 92/138, 154; 251/31

[56] References Cited
UNITED STATES PATENTS

| 2,219,816 | 10/1940 | Mould............................ | 92/154 X |
| 3,014,463 | 12/1961 | Krohm........................... | 92/138 X |
| 3,128,751 | 4/1964 | Dahl et al. ..................... | 92/138 X |
| 3,131,603 | 5/1964 | Hadekel........................ | 92/138 X |
| 3,213,758 | 10/1965 | Workman...................... | 92/138 X |
| 3,261,266 | 7/1966 | Ledeen et al. ................ | 92/138 |
| 3,452,961 | 7/1969 | Forsman........................ | 92/138 X |
| 3,115,329 | 12/1963 | Wing et al..................... | 251/31 |
| 3,223,113 | 12/1965 | Hopper ......................... | 251/31 X |
| 3,451,423 | 6/1969 | Priese............................ | 251/31 X |

Primary Examiner—Manuel A. Antonakas
Attorney—Robert W. B. Dickerson

ABSTRACT: An operator using pneumatic means, such as air, for causing movement of a further member, such as rotation of a valve stem to open or close the valve, wherein the operating fluid, such as air, is prelubricated, as by mixing with oil, to continually lubricate the operator parts and/or their connections with such further member, and to combat corrosion.

Ronald A. Gulick
INVENTOR.

BY

ATTORNEY

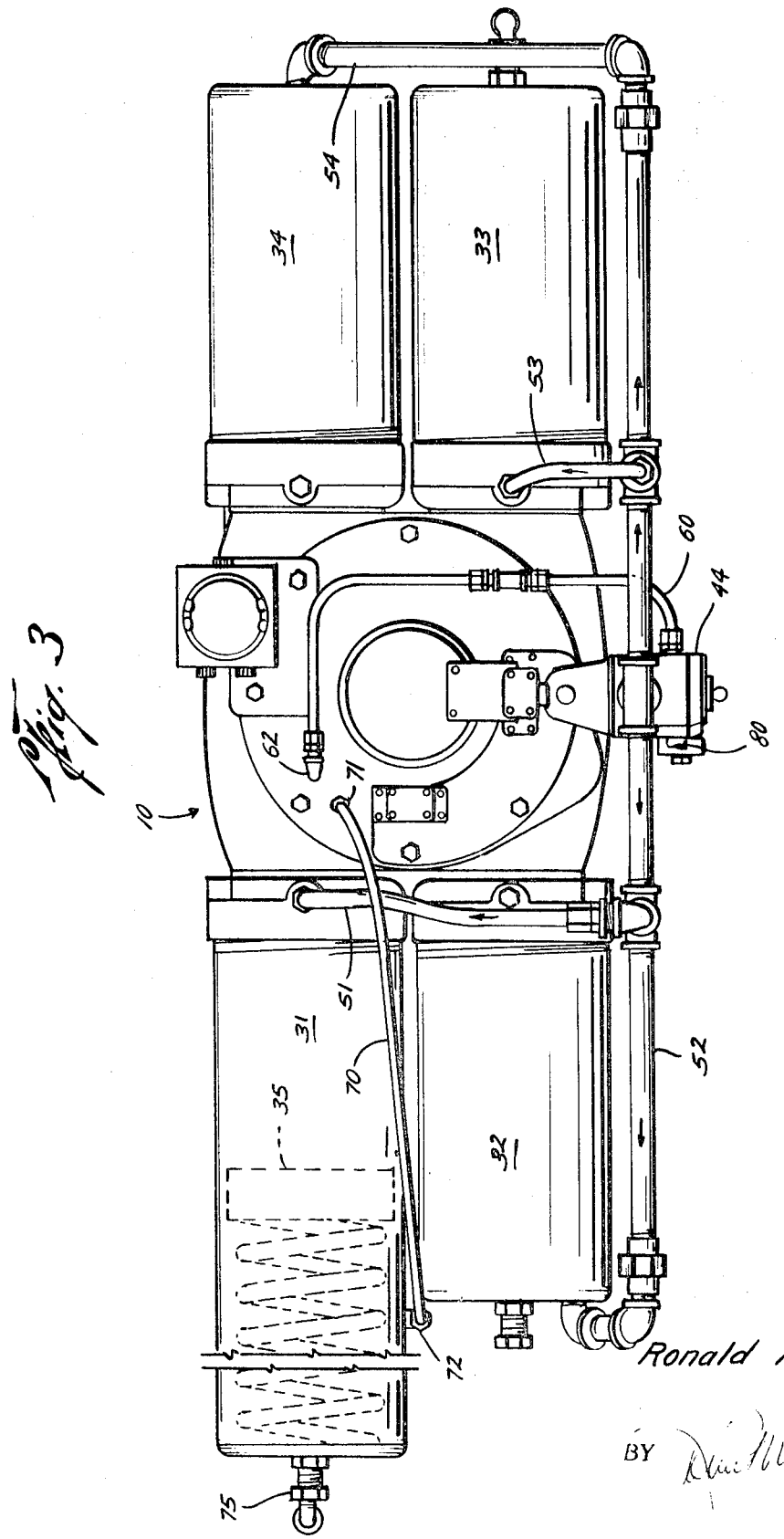

OPERATOR AND METHOD OF LUBRICATION THEREOF

BACKGROUND OF THE INVENTION

Operators or actuators have long been used to cause motion, longitudinal or rotational, of further devices. Such uses have included causing the opening or closing of valves such as may be used in systems transporting fluid material, such as petroleum products. Such operators have oftentimes been pneumatically actuated, i.e., air under pressure used to cause piston movement. Examples of such devices may be seen in U.S. Pat. Nos. 3,104,592 and 3,203,318. The maintenance of such operators, as in most mechanisms having movable parts, has proved burdensome in that maintenance requires continued lubrication of such moving parts as well as sometimes of the connection between the operator and an associated valve stem. Prior methods of solving such problems have included (a) submerging the mechanism in oil during operation, (b) pumping oil to the mechanism through conduits specially provided, and (c) periodically dismantling portions of the operator and greasing individual parts.

SUMMARY OF THE INVENTION

In the operation of this invention, which may contemplate air as the motivating medium or fluid, such air may be prelubricated. As such medium courses its normal path, it may contact the critical moving parts and thereby continually lubricate them. Further, the exhausted mixture may be utilized for cooling portions of the operator and/or of the associated valve structure. Other features and claimed advantages of operation may be discerned from the description of a preferred embodiment hereafter provided.

DESCRIPTION OF THE DRAWINGS

FIG. 3 is plan thereof with certain parts in dashed lines.

DESCRIPTION OF A PREFERRED EMBODIMENT

Figure 1:
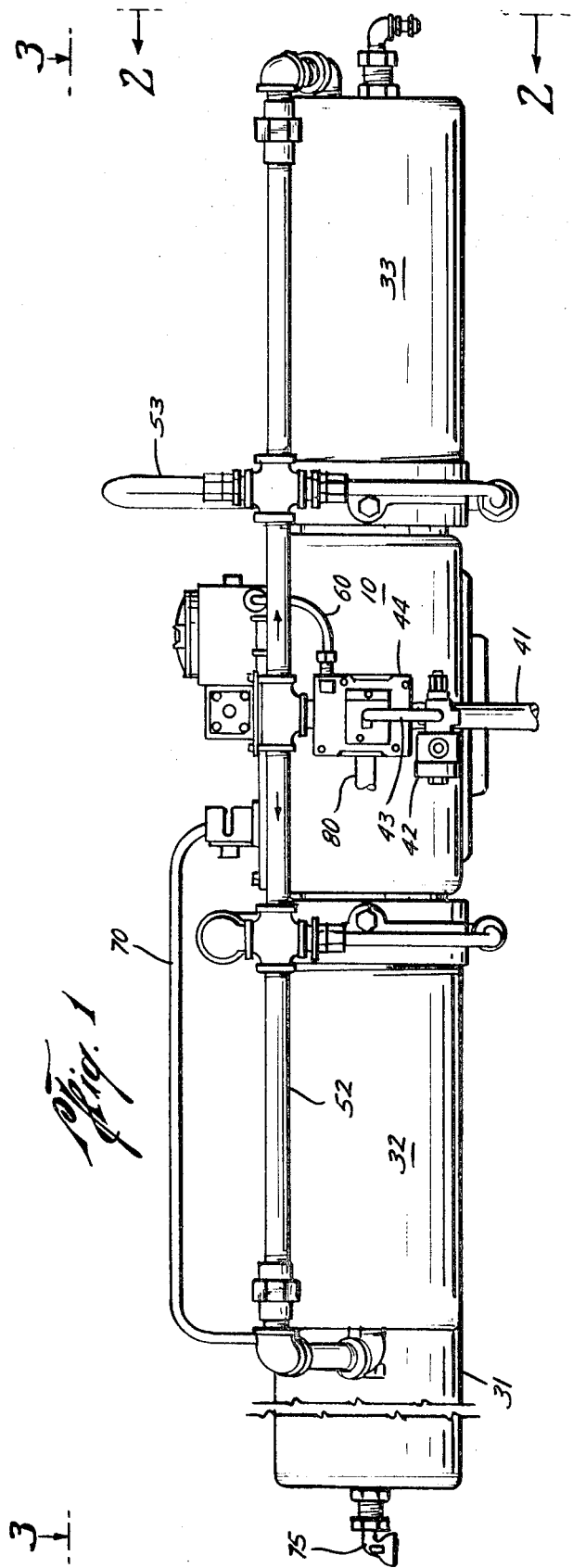
FIG. 1 is a front elevation of an operator that might be used to practice this invention.
Figure 2:
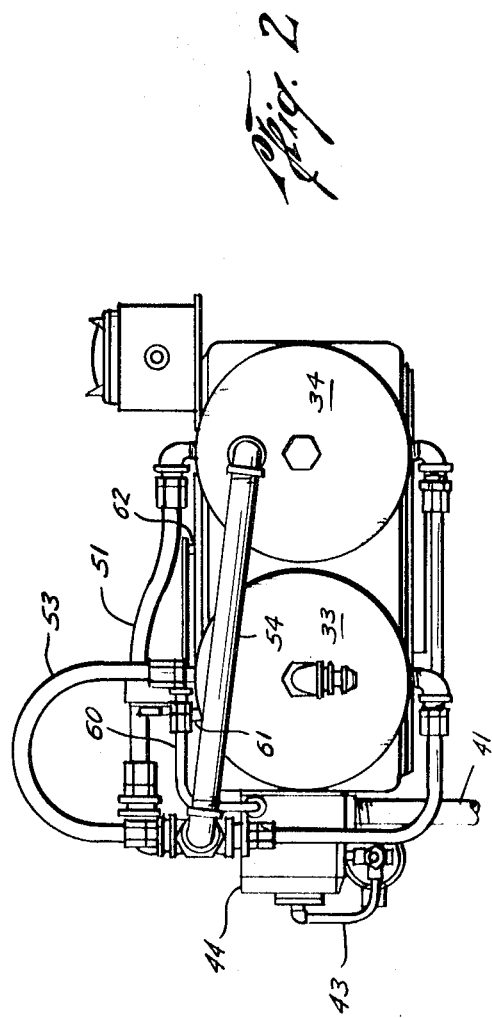
FIG. 2 is an end view of the device of FIG. 1.

The drawings show a somewhat generalized operator. Actuators or operators, as such, are well known in the art. They generally include one or more cylinders joined to a housing. Pistons positioned within the cylinders are caused to reciprocate by a motive fluid, such as air under pressure. Such piston reciprocation, in turn, may cause a valve stem to turn. Certain expediencies have included (1) combining the piston shaft with a rack, which rack may rotate a gear which is releasably connected to the valve stem, or (2) causing the reciprocating piston shaft to cause rotational movement of a yoke mechanism, as by a shaft pin linked to a yoke aperture, the yoke carrying means to rotate a valve stem, such as a keyed slot. In any case, the particular structure related to physically linking the pistons to the member that needs be turned is not critical to this invention.

In the drawings, numeral 10 identifies a central housing. Attached thereto are a plurality of piston cylinders 31, 32, 33 and 34. Each of these cylinders would normally contain a piston (not shown, except as indicated by 35 within cylinder 31). Oppositely disposed cylinders, such as 31 and 34, or 32 and 33, may have their pistons connected by being linked to opposite ends of the same shaft. Such pistons may obviously have their reciprocation governed by air being directed against alternate piston faces. Such alternation would normally use conduits to either cylinder end, a valve system (not shown) which may be within housing 10, and an outside pneumatic source. On the other hand, one or more of the pistons may be of the spring return type, such as illustrated by piston 35. As previously stated, this invention is not limited to a particular mechanism within housing 10, be it a yoke assembly, rack-and-pinion arrangement, or the like, used to translate the reciprocatory piston motion into useful motion of the related structure, as exemplified by a valve stem.

Initially, an activating fluid, such as air, would have a lubricant, such as oil, mixed with it and supplied, under pressure, to the operator, as through inlet 41. The particular source, such as a pump, need not be shown. Inasmuch as a spring return system is illustrated, a three-way valve 44 would control the direction of flow of such fluid mixture. Valve 44 may, if desired, be governed by pilot valve 42 which is linked by conduit 43 to member 44. During the pressure cycle, fluid would flow, in the direction of the arrows in FIG. 3, through conduits 51, 52, 53 and 54. This would tend to move the linked pistons within cylinders 31 and 34 to the left in FIG. 3, and those linked pistons within cylinders 32, 33 to the right. Such movement of piston 35 would compress the spring shown to be associated therewith. This would result in counterclockwise movement of the mechanism, such as a yoke assembly, within housing 10, used to control movement of the valve stem. During the exhaust portion of the cycle, a spring return device being shown, the pressure would released permitting piston 35 to be moved to the right by its spring. By virtue of the linkage mentioned, the piston within cylinder 34 would move along therewith. And, by virtue of the connection of the yoke or like device in housing 10 to the pistons in cylinders 32, 33, or to their linked shafts, such pistons would move to their left, in FIG. 3. The motivating fluid would return through the conduits from whence it came, but in an opposite direction to be exhausted, as at 80. (At this point it may be noted that were pneumatic means alone used to effect piston movement, i.e., not a spring return, the general operation would be the same. Member 44 might include a four-way valve, and additional conduits might be provided each cylinder so that entry and exhausts would be present at each cylinder end.)

Leading off a cap in the exhaust chamber of valve member 44 is housing lubrication conduit 60. It is seen to enter housing 10 through conduits at plural points 61, 62. The lubricated mixture, on entering at such points, would lubricate critical moving parts located in those areas. Obviously, more than two such lubrication positions may be provided. It is further seen that conduit 70 exits housing 10 at 71, adjacent point 62, to enter the spring return cylinder 31 at point 72. This latter position may be treated as the housing exhaust tap, and the lubricating fluid may be used to spray and lubricate the spring member prior to being exhausted through outlet 75. The exhaust openings described heretofore may include a low differential pressure relief valve, such as a rubber bladder to prevent backflow of atmospheric air into the system.

Inasmuch as the system air undergoes considerable expansion during operation while coursing or passing through the operator, the exhausted fluids may produce a refrigerant effect during high temperature utilization. For example, the exhausted lubricated gas or fluids exiting through member 80 may be piped so as to pass adjacent the actuator shaft or valve stem through a simple extension of said member 80.

It should be apparent that the prime utility of this invention lies in the area of permitting the normal operation of an operator or actuator, and, at the same time, permitting lubrication of critical parts of the mechanism. Such dual function finds utility in a large number of pneumatic actuated devices other than valve operators. Thus, numerous modifications of the described embodiment would quite clearly lie within the spirit of the invention, and scope of the following in which is claimed:

1. In a pneumatically activated actuator having a central housing, means for causing movement of a related device, at least one piston-containing cylinder operatively connected to said housing, said piston being operatively connected to said movement of said related device, and conduit means for supplying pressurized fluid to said cylinder during the power stroke of the piston in said cylinder and for exhausting said fluid from said cylinder during the return stroke of said cylinder's piston, the improvement comprising:

a reservoir of a mixture of pressurized air and a lubricating fluid connected to said conduit means;

means for causing said mixture to flow in one direction through at least a portion of said conduit means during said power stroke and contacting one face of the piston and for causing said mixture to flow in another direction through said portion of said conduit means during said return stroke.

2. The actuator of claim 1 and including further conduit means linking the interior of said central housing, to said reservoir whereby part of said mixture may flow into said housing interior.

3. A pneumatically activated actuator having a central housing including means for causing movement of a related device,
a plurality of piston-containing cylinders operatively connected to said housing, said pistons being operatively connected to said movement causing means whereby piston movement results in movement of said related device,
and conduit connections to a source of pressurized fluid, the improvement comprising:
A source of a mixture of pressurized air and a lubricating fluid joined to one end of said conduit connections, the other end being joined to a valve member associated with said housing;
means for causing said mixture to flow in one direction through additional conduits to each of said cylinders causing their respective pistons to move in a particular direction;
means for causing said mixture to flow in the opposite direction from said one direction through said additional conduits when said pistons move in the opposite direction to said particular direction;
further conduit means linking said valve member to the interior of said housing, whereby part of said fluid may flow into said housing interior;
and including separate conduit means linking said central housing with at least a particular one of said cylinders at the end of said particular cylinder opposite the end at which it is linked to its respective one of said additional conduits.

4. A method of activating and lubricating an actuator having a central housing and at least one piston-containing cylinder, comprising the steps of:
premixing a mixture of an activating fluid and a lubricant;
under pressure, causing at least part of said mixture to be conducted through conduits to against one face of said piston thereby causing said one piston to move in one direction
causing said piston to move in a direction opposite to said one direction; and
causing said mixture to return through said conduits on said piston moving in said opposite directions.

5. The method of claim 4 and including the further step of causing a portion of said mixture to enter the interior of said housing.

6. A method of activating and lubricating an actuator having a central housing and a plurality of piston-containing cylinders comprising the steps of:
premixing a mixture of an activating fluid and a lubricant;
under pressure, causing said mixture to be conducted to valving associated with said housing;
causing some of said mixture to pass from said valving through conduits to one end of each of said cylinders thereby causing piston motion in one direction in each of said cylinders;
causing a portion of said mixture to move from said valving to the interior of said housing, subsequent to causing said mixture portion to move from said valving to said housing interior, causing said immediately aforementioned mixture portion to move from said housing interior to another end of at least one of said cylinders;
causing said pistons to move in a direction opposite to said one direction; and
causing said fluid mixture supplied to said respective cylinders to return to said valve from each of said cylinders on said pistons moving in said opposite direction.